United States Patent
Wesolowski et al.

[11] Patent Number: 5,870,865
[45] Date of Patent: Feb. 16, 1999

[54] METHOD FOR REPAIRING A DRAINAGE SYSTEM

[75] Inventors: John S. Wesolowski, Cuyahoga Falls; Jack Myers, Akron, both of Ohio

[73] Assignee: Everdry Marketing & Management, Inc., Macedonia, Ohio

[21] Appl. No.: 882,859

[22] Filed: Jun. 26, 1997

[51] Int. Cl.⁶ ..................................... F16L 1/028
[52] U.S. Cl. ................. 52/169.5; 52/169.14; 52/302.3; 52/741.11; 285/31; 285/236; 405/157
[58] Field of Search ............................. 52/742.1, 742.12, 52/741.11, 742.13, 169.5, 169.14, 573.1, 302.3; 285/31, 32, 45, 236; 405/157

[56] References Cited

U.S. PATENT DOCUMENTS

| | | |
|---|---|---|
| 146,572 | 1/1874 | Clark . |
| 1,538,669 | 5/1925 | Smith . |
| 2,116,165 | 5/1938 | Ullman . |
| 2,981,072 | 4/1961 | Brewington . |
| 3,287,866 | 11/1966 | Bevilacqua . |
| 3,465,529 | 9/1969 | Bernd-Heinz Helle . |
| 3,754,362 | 8/1973 | Daimler et al. . |
| 3,865,410 | 2/1975 | Chen ........................................ 285/31 |
| 4,075,800 | 2/1978 | Molick . |
| 4,136,500 | 1/1979 | DiFiore . |
| 4,172,607 | 10/1979 | Norton ................................... 285/236 |
| 4,333,281 | 6/1982 | Searfone . |
| 4,380,348 | 4/1983 | Swartz ................................... 285/236 |
| 4,538,386 | 9/1985 | DiCello . |
| 4,690,434 | 9/1987 | Schmidt ................................... 285/31 |
| 4,715,626 | 12/1987 | Gehring et al. ...................... 285/236 X |
| 4,776,613 | 10/1988 | Dickey et al. ........................... 285/24 |
| 4,795,199 | 1/1989 | Gehring et al. ........................ 285/236 |
| 4,921,374 | 5/1990 | Stutzman ............................ 405/157 X |
| 5,011,193 | 4/1991 | Porte ........................................ 285/31 |
| 5,082,313 | 1/1992 | Bryant et al. ......................... 285/31 X |
| 5,099,889 | 3/1992 | Ratzlaff ............................. 405/157 X |
| 5,193,859 | 3/1993 | McKinnon ......................... 285/236 X |
| 5,393,103 | 2/1995 | Cretzler ................................... 285/31 |
| 5,527,070 | 6/1996 | Blackwell ................................ 285/45 |
| 5,551,797 | 9/1996 | Sanford ............................ 52/169.5 X |
| 5,634,304 | 6/1997 | Sakno ............................... 52/573.1 X |

Primary Examiner—Christopher Kent
Assistant Examiner—Yvonne Horton-Richardson
Attorney, Agent, or Firm—Fay, Sharpe, Beall, Fagan, Minnich & McKee

[57] ABSTRACT

A method for repairing a drainage system adjacent a foundation wall includes the step of digging a first ditch to provide access to a section of drain tile, removing that section of the drain tile, digging a second ditch to provide access to a damaged area of the foundation, the second ditch being of a width that is narrower than the first ditch to provide support areas of undisturbed earth. The damaged area is then repaired and a rigid pipe installed and supported on the support areas. Since the rigid pipe is supported on support areas, no sagging of the replaced portion of the drainage system will occur in the event that the underlying earth settles or becomes unstable.

15 Claims, 3 Drawing Sheets

METHOD FOR REPAIRING A DRAINAGE SYSTEM

BACKGROUND OF THE INVENTION

This invention pertains generally to the art of drainage systems. Specifically, the invention pertains to a method for repairing a drainage system.

The invention is particularly applicable to the repair of drainage systems that are accidentally or intentionally disrupted or damaged during excavation to gain access to a damaged area of a foundation wall. The invention will be described with particular reference to that environment. It will be appreciated, however, that the invention has broader application and may be advantageously employed to repair any drainage system where the function thereof is jeopardized because the earth or material providing underlying support to the system has been disturbed or has become unstable.

The foundation walls of many buildings are constructed from hollow concrete or cinder blocks. While these materials are inexpensive, they are also disadvantageous because they are porous and permit water and moisture to pass from the exterior of the building to its interior. The seepage of water or liquid through the foundation of a building is obviously undesirable because it adversely affects the comfort of occupants therein and because seepage may result in the weakening of the foundation itself. As such, much effort has been expended to develop ways to prevent the seepage of water through foundations of structures. Such effort has resulted in the development of drain tiles and other drainage systems for eliminating or reducing the accumulation of water in the vicinity of foundation walls.

Known drainage systems frequently take the form of subterranean drain tiles disposed around the outer perimeter of the foundation. These drain tiles typically comprise a pipe that is provided with a number of apertures therein to permit ingress of water from the surrounding soil. Typically, the drain tiles are disposed in a gravel bed to improve their ability to accumulate water from the surrounding area. Water entering the drain tile is conveyed to a remote location away from the building. One known drainage system is disclosed in U.S. Pat. No. 4,538,386, the subject matter of which is incorporated herein in its entirety by reference. That system comprises two sets of drain tiles, one located on the exterior of a foundation wall, and one located on the interior of the foundation wall.

Often, especially in areas where ground shifting is common, foundation walls will develop cracks, bowing or other damage which may require that a portion of the wall be unearthed to expose the damaged area for repairs. In this sense, the aforementioned prior art drainage systems are problematic because they interfere with excavation required to gain access to the damaged area of the foundation. It is usually not feasible to leave the drainage system intact while attempting to excavate the earth in the vicinity of the damaged wall area. Instead, a section of the drainage system is exposed and removed and the earth beneath it excavated so that repair personnel and equipment may have access to the damaged area of the foundation.

After repairs are made to the damaged wall, the earth and the removed section of the drainage system are replaced. Often, in prior art repair methods, settling of the newly replaced earth beneath the drainage system will result in a section of the replaced drainage system being inadequately supported. This, in turn, may result in a sagging and breakage of the drain tiles, thereby impairing the ability of the drainage system to convey water away from the foundation.

One solution to the aforementioned problem is to refill the excavated area with gravel instead of the original earth. Gravel is less prone to settling, but its presence may result in the undesirable accumulation of water in the area near the foundation wall. It would, therefore, be advantageous to provide a repair method that eliminates the aforementioned problems. Namely, it would be desirable to provide a repair system that provides adequate support to the drainage system, is immune or less susceptible to the adverse consequences of ground settling, and does not result in the undesirable accumulation of water near the foundation.

Accordingly, it has been considered desirable to develop a new and improved method for repairing a drainage system which would overcome the foregoing difficulties, meet the above-stated needs and provide better and more advantageous results.

SUMMARY OF THE INVENTION

The present invention contemplates a new and improved method that overcomes all of the aforementioned problems and others and provides a method of repairing a drainage system that is simple and easy to perform, economical and which preserves the integrity of the drainage system even in the presence of settling of the underlying earth.

In accordance with one aspect of the invention, there is provided method of repairing a subterranean drainage system including an impaired section of drain tile extending above an area of settled earth. The method comprises the steps of: a) unearthing the impaired section of drain tile by excavating a drain tile ditch; b) removing the impaired section of the drain tile to expose two drain tile ends that extend into the drain tile ditch; c) installing a rigid pipe in place of the impaired section of the drain tile, opposite ends of the pipe being configured to engage a respective drain tile end.

In accordance with a more limited aspect of the present invention, there is provided a method of repairing a subterranean drainage system adjacent a foundation wall. This method comprising the steps of: a) unearthing a section of drain tile by excavating a drain tile ditch; b) removing a section of the drain tile to expose two drain tile ends that extend into the drain tile ditch; c) excavating an access ditch to provide access to a damaged area of the foundation wall, the access ditch being of a length that is less than the length of the drain tile ditch, thereby forming support areas of undisturbed earth beneath each of the drain tile ends; d) repairing the damaged area of the foundation wall; e) filling the access ditch with earth; and f) installing a rigid pipe in the drain tile ditch, for providing fluid communication between the drain tile ends, opposite ends of the rigid pipe being supported on respective support areas.

In a preferred embodiment, the dimensions of the rigid pipe are such that the rigid pipe encircles the outer periphery of the removed drain tile section. The rigid pipe may sealingly engage the drain tile ends. The use of the rigid pipe in combination with the support areas of undisturbed earth, provides support to the drainage system and prevents sagging of the drainage system should the underlying ground settle.

In accordance with a more limited aspect of the invention, the ends of the rigid pipe are provided with a coupling to provide a seal between the rigid pipe and the drain tile ends. In accordance with another aspect of the invention, the original section of the drain tile that is removed may be inserted into the interior of the rigid pipe before the rigid pipe is installed to thereby provide a more uniform flow path for the water which might accumulate within the drain tile.

One advantage of the present invention is the provision of a new and improved method for repairing a drainage system.

Another advantage of the invention is that use of a rigid pipe in combination with support areas of undisturbed earth provide thorough support to the drainage system segment below which the earth has been excavated or otherwise disrupted.

Still another advantage of the invention is that the use of a rigid pipe eliminates the need for gravel as a filler for the access ditch. This, in turn, eliminates the accumulation of water that may occur with gravel fillers and reduces the expense of the repair.

Many other advantages and benefits of the invention will become apparent to those skilled in the art upon a reading and an understanding of the detailed description which follows.

BRIEF DESCRIPTION OF THE DRAWINGS

The invention may take physical form in certain method steps and arrangements of method steps, a preferred embodiment of which will be described in detail in the specification and illustrated in the accompanying drawings which form a part hereof.

DETAILED DESCRIPTION OF THE PREFERRED EMBODIMENT

Figure 3:
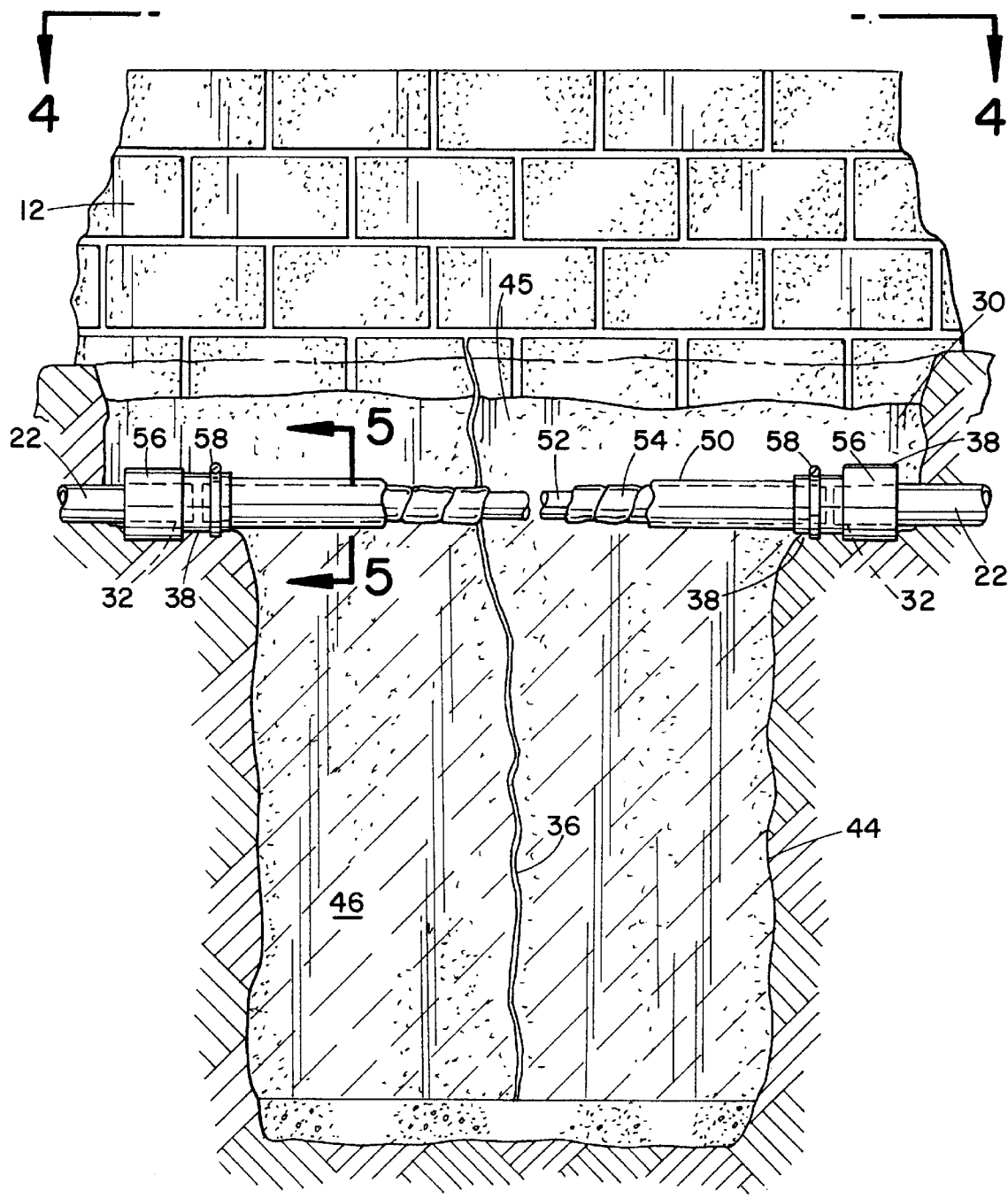
FIG. 3 is a front elevational view of a means for repairing a foundation wall which utilizes a drainage system repair method according to the present invention.
Figure 4:
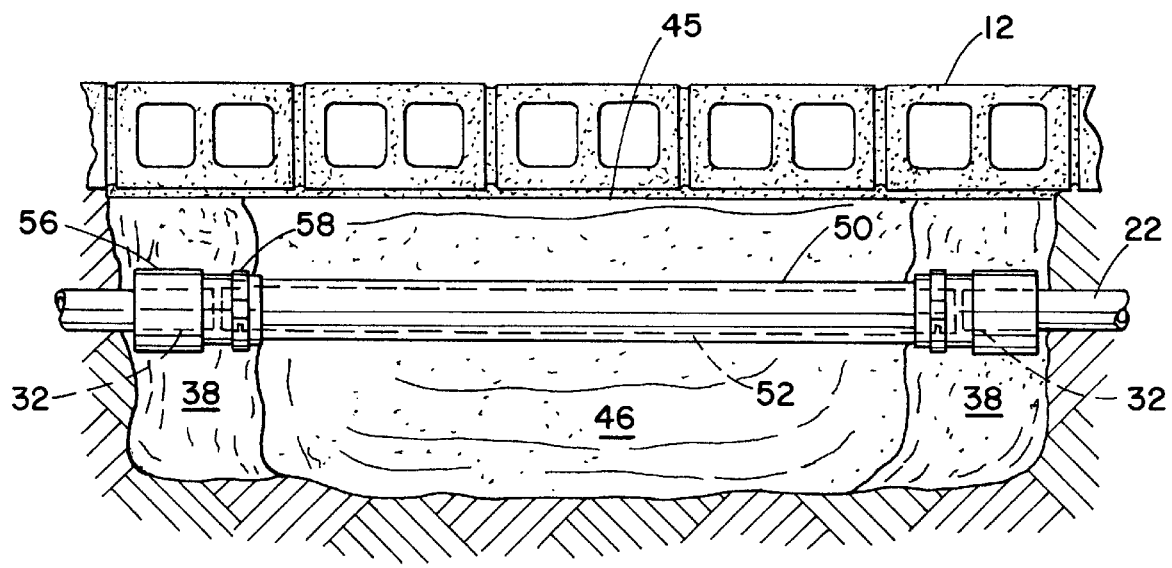
FIG. 4 is a top plan view of the drainage system taken along lines 4—4 of FIG. 3.
Figure 5:
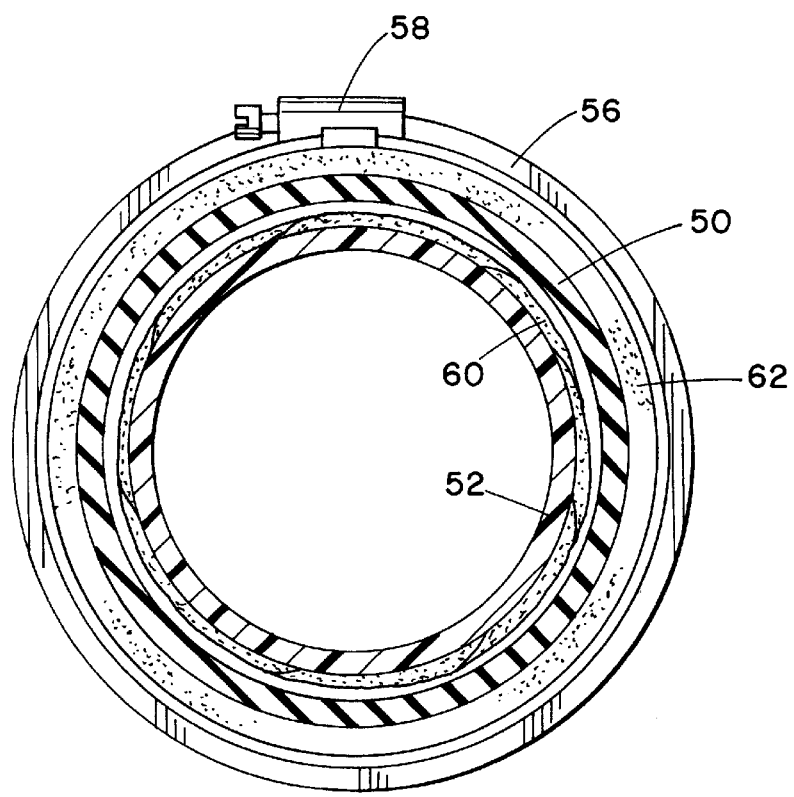
FIG. 5 is an enlarged cross-sectional view of a segment of the drainage system taken along lines 5—5 in FIG. 3.

Referring now to the drawings wherein the showings are for the purposes of illustrating the preferred embodiment in the invention only and not for purposes of limiting it, FIGS. 3–5 show generally a drainage repair system according to the present invention.

Figure 1:
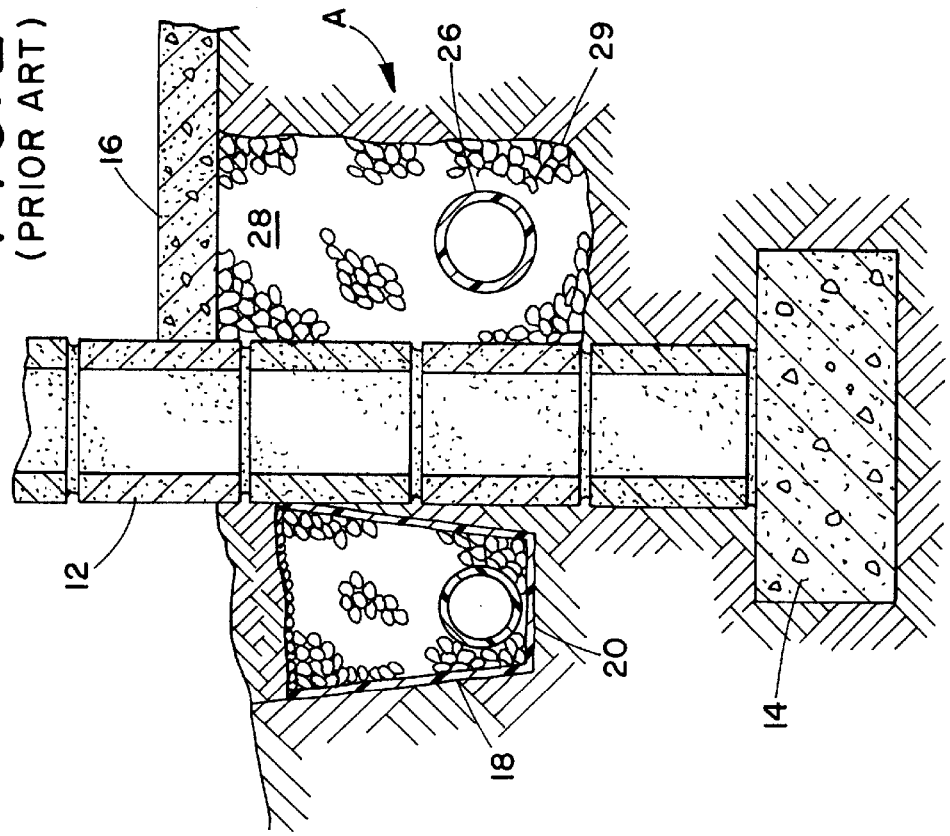
FIGS. 1 and 2 depict a drainage system according to the prior art.
Figure 2:
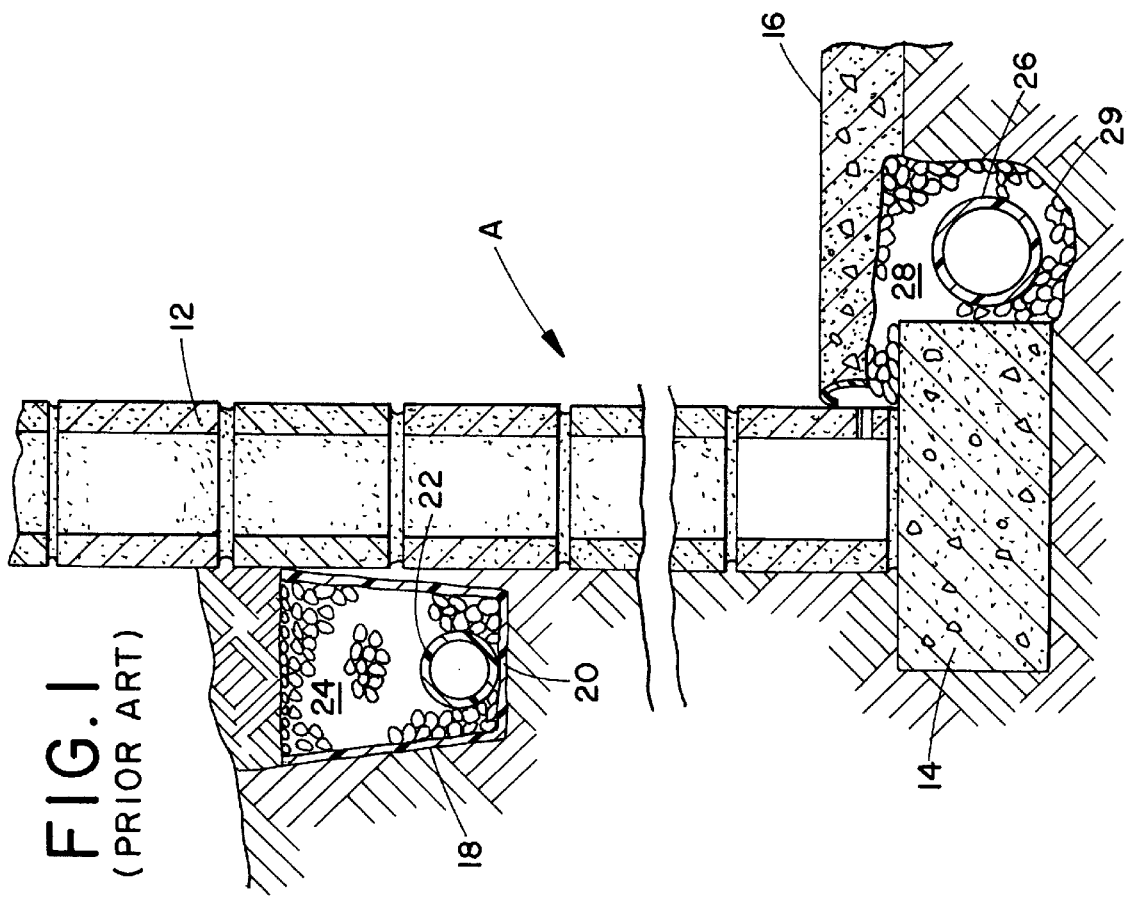

Prior art FIGS. 1 and 2 depict cross-sections of drainage systems like those disclosed in U.S. Pat. No. 4,538,386. These systems, generally referenced by the letter A, include a foundation wall 12 that is disposed on a footer 14 beneath floor 16. An outside trench 18, which is usually about 14 inches wide and 18 inches deep, is dug and lined with a plastic sheet or visqueen 20. A drain tile 22 is provided inside the trench 18 and is buried in gravel 24 to form a drainage system that extends along the length of the wall adjacent thereto. Another drain tile 26 is disposed beneath the basement floor 16 on the interior side of foundation wall 12 and includes gravel 28 inside a trench 29. Referring to FIG. 2, a drainage system similar to that of FIG. 1 is shown, except that the interior and exterior drain tiles are provided at approximately the same level because the floor of the structure is at ground level.

Referring now to FIG. 3, there is illustrated a front view of a repair resulting from the method of a preferred embodiment of the present invention. A drain tile ditch 30 has been excavated to expose drain tile 22. Excavation of drain tile ditch 30 may include the removal of the gravel bed (not shown in FIGS. 3 and 4) surrounding the drain tile 22. Drain tile 22 is then cut in two places using, for example, a pipe cutter or saw, and the section therebetween is removed, thereby providing two drain tile ends 32 (shown in dashed lines). Next, access ditch 44 is excavated to expose and provide access to the damaged area 36 of foundation 12. The damaged area is shown to be a vertically extending crack in the blocks constituting the foundation wall. In accordance with the present invention, the access ditch 44 is of a width that is more narrow than the length of drain tile which has been excavated so that support areas 38 of undisturbed earth remain intact beneath the drain tile ends 32.

With the damaged area 36 of the foundation 12 exposed, it may now be repaired using any known method, for example, by applying a sealant, such as tar, mortar or other like material to the damaged area. In one preferred embodiment, a fibrated trowel mastic is applied to seal the damaged area. Specifically, a layer of a 4 mil visqueen is installed over the mastic. A second layer of mastic and visqueen are then applied over the first. These elements are identified by the numeral 45. After the damaged area 36 has been repaired, the earth initially excavated to provide access ditch 44 is replaced and may be tamped down or compressed at various stages in order to prevent settling and accumulation of water. The access ditch is filled up with earth 46 (shown in hatching) to a level coincident with support areas 38.

After the access ditch has been filled, a rigid solid, non-perforated, pipe 50 is installed to provide fluid communication between the drain tile ends 32. In accordance with a preferred embodiment of the invention, the removed section 52 (represented by dashed lines in FIGS. 3 and 4) of drain tile is wrapped with a layer of visqueen 54 (a polyethylene material manufactured by Ethyl Corporation of New York, N.Y. and by Monsanto Chemical Company of St. Louis, Mo.) and inserted into the rigid pipe 50 before pipe 50 is installed in fluid communication with drain tile ends 32. The length of rigid pipe 50 is selected such that it is supported at both ends on support areas 38 of undisturbed soil. Pipe 50 is constructed of a material, such as metal or a hard plastic, which is resistive to sagging or to bending under lateral forces and preferably is of an inner diameter which is sufficiently large so as to enclose the drain tile (which is typically of a 3-inch outer diameter). A four inch diameter pipe 50 has been found sufficient for this purpose.

As shown in FIG. 4, a conventional coupling 56 is provided at each end of the rigid pipe 50 to provide a fluid-tight connection between the rigid pipe 50 and the ends 42 of the drain tile. A clamp 58 may be provided on each coupling 56 to secure it to the outside diameter of the rigid pipe 50. It will be recognized that the length of rigid pipe 50 is selected such that it is supported at both ends on the support areas 38. Because of its rigid construction, pipe 50 will resist sagging should the ground below it settle or shift. After rigid pipe 50 has been placed in fluid communication with the ends of the drain tile 42, drain tile ditch 30 is filled with gravel and/or earth.

It will be recognized, however, that pipe 50 may be of a diameter equal to the diameter of drain tile ends 32 and provided flush thereto, with suitable sealing implements provided therearound. In that case, the removed section 52 of drain tile is discarded rather than being inserted within pipe 50.

FIG. 5 illustrates in detail a cross-section, taken at line 5—5 of FIG. 4. Drain tile 52 is wrapped with a layer of visqueen 60 and inserted within rigid pipe 50. In accordance with a preferred embodiment of the invention, a rubber boot 62 is installed around the outer periphery of rigid pipe 50. The coupling 56 is then installed around the rubber boot 62 and secured with the clamp 58.

Those of ordinary skill will recognize that the repair system of the present invention is applicable to drainage systems which may not be in the vicinity of a foundation wall. For example, in a drain tile portion which is used to convey water at a remote location from a structure, there may be a need to excavate the surrounding area and/or the soil beneath the drain tile, or the earth beneath the drain tile may have settled or become unstable and caused the drain tile to sag in that area. In such a case, the method of the present invention would be applicable to provide support to the impaired area of the drain tile. The impaired section of the drain tile could be removed and the earth below it removed or replaced. In accordance with the present invention, where access to an area beneath the drain tile is required, the access ditch would be dug with a width which is less than the width of the removed drain tile section such that a support area is provided at each end of the removed drain tile. In cases where no access to the area beneath the drain tile is required, the impaired section of the drain tile can be removed and, in accordance with the present invention, a rigid pipe can be installed across the area of unstable or settled earth.

The invention has been described with reference to the preferred embodiment. Obviously, modifications and alterations will occur to others upon reading and understanding of this specification. This specification is, therefore, intended to include all such modifications and alterations insofar as they come within the scope of the appended claims or equivalents thereof.

What is claimed is:

1. A method of repairing a subterranean drainage system, including a drain tile adjacent a foundation wall, the method comprising the steps of:
   a) unearthing a section of drain tile by excavating a drain tile ditch;
   b) removing a section of the drain tile to expose two drain tile ends that extend into the drain tile ditch;
   c) excavating an access ditch to provide access to a damaged area of the foundation wall, the access ditch being of a width that is less than the width of the drain tile ditch, thereby forming support areas of undisturbed earth beneath each of the ends of the removed drain tile;
   d) repairing the damaged area of the foundation wall;
   e) filling the access ditch with earth;
   f) installing a rigid pipe in the drain tile ditch; and
   g) communicating opposite ends of the rigid pipe with the drain tile ends.

2. The method according to claim 1, wherein the step of installing the rigid pipe comprises the step of selecting the rigid pipe to be of a diameter that is greater than a diameter of the drain tile ends.

3. The method according to claim 1, wherein the step of installing the rigid pipe includes the step of providing, on each end of the rigid pipe, a coupling to sealingly engage a respective drain tile end.

4. The method according to claim 1, wherein the step of installing the rigid pipe includes the step of inserting the removed section of drain tile within the rigid pipe.

5. The method according to claim 1, further comprising the step of supporting the opposite ends of the rigid pipe on respective support areas.

6. A method of repairing a subterranean drainage system including an impaired section of drain tile extending above an area of settled earth, the method comprising:
   a) unearthing the impaired section of drain tile by excavating a drain tile ditch;
   b) removing the impaired section of the drain tile to expose two drain tile ends that extend into the drain tile ditch;
   c) digging a second ditch, narrower than the drain tile ditch, to remove the area of settled earth, thereby forming support areas of undisturbed earth beneath the drain tile ends; and,
   d) installing a rigid pipe in place of the impaired section of the drain tile, opposite ends of the pipe being configured to engage a respective drain tile end.

7. The method according to claim 6, further comprising the step of supporting the opposite ends of the rigid pipe on said respective support areas.

8. The method according to claim 6, wherein the step of installing the rigid pipe includes the step of providing, on each end of the rigid pipe, a coupling to sealingly engage a respective drain tile end.

9. The method according to claim 6, wherein the step of installing the rigid pipe includes the step of inserting the removed section of drain tile within the rigid pipe.

10. The method according to claim 6, wherein the step of installing the rigid pipe includes the step of selecting the rigid pipe to be of a diameter greater than the drain tile.

11. A subterranean drainage system comprising:
   a first drain tile end and a second drain tile end, wherein said drain tile ends are formed by removing a section of drain tile intermediate the first and second drain tile ends;
   a rigid pipe, having first and second ends;
   a first coupling for connecting the first drain tile end to the first end of the rigid pipe;
   a second coupling for connecting the second drain tile end to the second rigid pipe end to provide fluid communication therebetween; and,
   wherein an intermediate section of drain tile is disposed within the rigid pipe.

12. The drainage system according to claim 11, further comprising a layer of visqueen disposed around the intermediate drain tile section.

13. The drainage system according to claim 11, further comprising a coupling disposed on each end of the rigid pipe for sealingly engaging a respective one of the first and second drain tile ends.

14. The drainage system according to claim 13, further comprising a clamp disposed around each of the couplings.

15. The drainage system according to claim 13, further comprising a rubber boot located adjacent said coupling and encircling at least one of said first and second drain tile ends.

* * * * *